United States Patent
Takayama

(10) Patent No.: US 10,440,216 B2
(45) Date of Patent: Oct. 8, 2019

(54) IMAGE READING DEVICE AND IMAGE FORMING APPARATUS

(71) Applicant: KYOCERA Document Solutions Inc., Osaka-shi, Osaka (JP)

(72) Inventor: Ryo Takayama, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 16/129,561

(22) Filed: Sep. 12, 2018

(65) Prior Publication Data
US 2019/0082074 A1    Mar. 14, 2019

(30) Foreign Application Priority Data

Sep. 13, 2017  (JP) ................................ 2017-175443

(51) Int. Cl.
| | |
|---|---|
| H04N 1/04 | (2006.01) |
| H04N 1/12 | (2006.01) |
| G03G 15/02 | (2006.01) |
| H04N 1/028 | (2006.01) |
| G03G 15/00 | (2006.01) |
| G03G 21/00 | (2006.01) |

(52) U.S. Cl.
CPC ......... *H04N 1/121* (2013.01); *G03G 15/0258* (2013.01); *G03G 15/6511* (2013.01); *G03G 21/00* (2013.01); *H04N 1/02815* (2013.01); *G03G 15/6573* (2013.01)

(58) Field of Classification Search
CPC ........................... H04N 1/121; H04N 1/02815
USPC .......................................................... 358/474
See application file for complete search history.

(56) References Cited

U.S. PATENT DOCUMENTS

| | | | |
|---|---|---|---|
| 6,178,274 B1 | 1/2001 | Youda et al. | |
| 6,349,155 B1 | 2/2002 | Youda et al. | |
| 6,862,115 B1* | 3/2005 | Kondo | H04N 1/0057 358/472 |
| 9,167,125 B2* | 10/2015 | Shimazu | H04N 1/0461 |
| 2003/0038989 A1* | 2/2003 | Yokota | H04N 1/203 358/474 |

FOREIGN PATENT DOCUMENTS

JP          10112771 A       4/1998

* cited by examiner

*Primary Examiner* — Houshang Safaipour
(74) *Attorney, Agent, or Firm* — Alleman Hall Creasman & Tuttle LLP

(57) ABSTRACT

An image reading device includes a feeder, a flexible transmission path, and a charge remover. The feeder conveys an image sensor in a forward direction directed from a reading start position toward a reading end position, and a backward direction opposite thereto. The flexible transmission path extends from a connection portion that is electrically connected to the image sensor, to a specific location within a reading range between the reading start position and the reading end position, and curved the connection portion and the specific location. The charge remover includes a conductor which abuts on an upper surface of the flexible transmission path and is grounded. With a reciprocal movement of the image sensor, the charge remover moves between a stop position being away from the reading start position in the forward direction, and a position being on the reading end position side of the stop position.

8 Claims, 9 Drawing Sheets

IMAGE READING DEVICE AND IMAGE FORMING APPARATUS

INCORPORATION BY REFERENCE

This application is based upon and claims the benefit of priority from the corresponding Japanese Patent Application No. 2017-175443 filed on Sep. 13, 2017, the entire contents of which are incorporated herein by reference.

BACKGROUND

The present disclosure relates to an image reading device configured to emit light to a document sheet on a contact plate, and generate image data based on reflected light, and to an image forming apparatus.

In image reading devices, a contact plate may be electrostatically charged by being friction charged when it comes in contact with a document sheet or a cover. As a measure to prevent this, a conductive film may be contacted with the contact plate while the conductive film is grounded.

SUMMARY

An image reading device according to an aspect of the present disclosure includes a contact plate, a light source, an image sensor, a feeder, a flexible transmission path, and a charge remover. A document sheet is placed on the contact plate. The light source emits light to the document sheet. The image sensor is provided below the contact plate and receives light reflected from the document sheet. The feeder conveys the light source and the image sensor in a forward direction and a backward direction, the forward direction being directed from a reading start position toward a reading end position, the backward direction being an opposite direction to the forward direction. The flexible transmission path extends from a connection portion that is electrically connected to the image sensor, to a specific location within a reading range between the reading start position and the reading end position, and curved between the connection portion and the specific location. The flexible transmission path transmits image data through it. The charge remover includes a conductor which abuts on an upper surface of the flexible transmission path and is grounded. With a reciprocal movement of the light source and the image sensor, the charge remover moves between a stop position that is away from the reading start position in the forward direction, and a position that is on the reading end position side of the stop position.

An image forming apparatus according to another aspect of the present disclosure includes the image reading device and an image former. The image former forms an image based on image data generated by the image sensor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings for the understanding of the present disclosure. It should be noted that the following embodiments are examples of specific embodiments of the present disclosure and should not limit the technical scope of the present disclosure.

Figure 1:
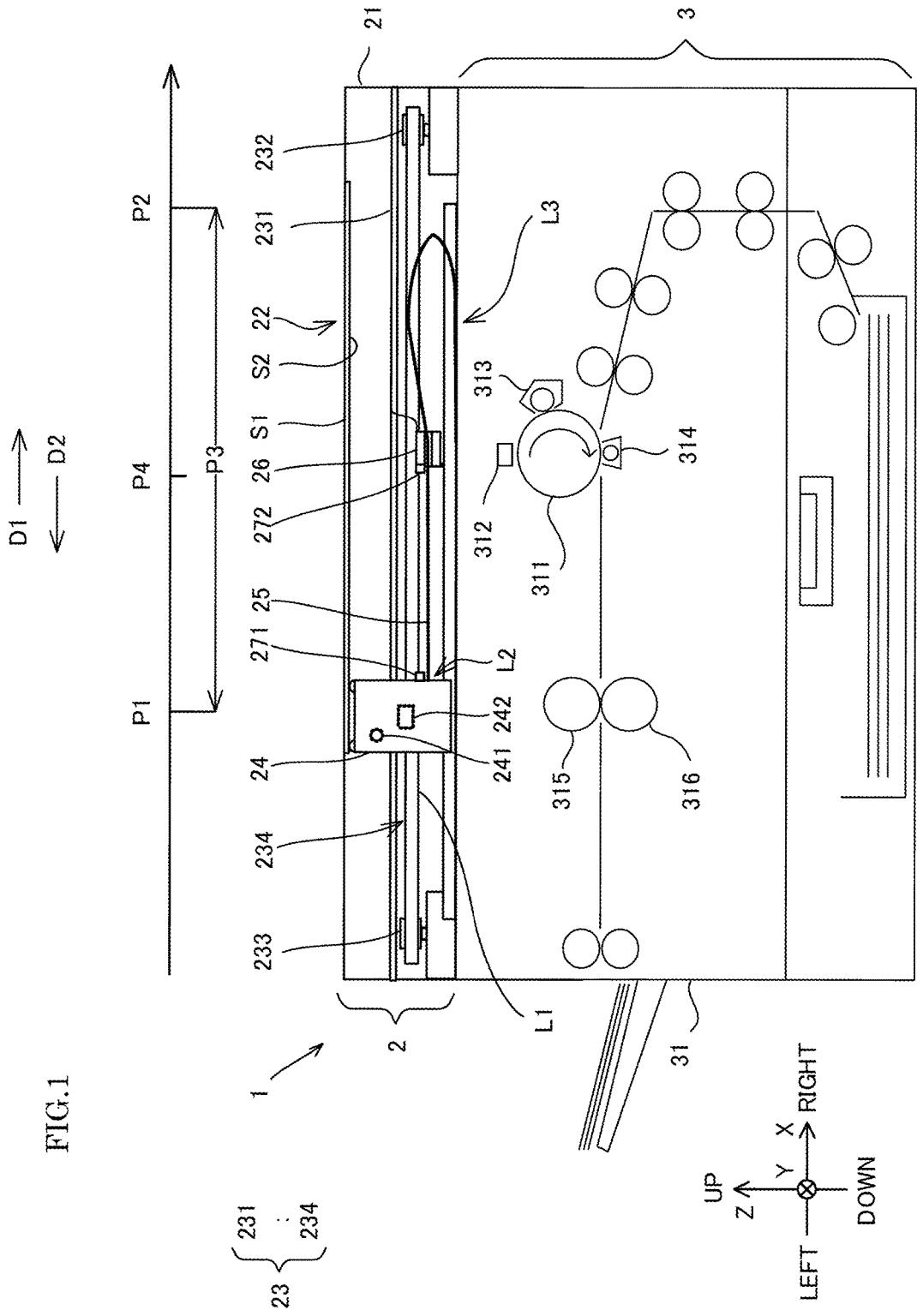
FIG. 1 is a schematic diagram showing a configuration of an image reading device according to an embodiment of the present disclosure, and an image forming apparatus including the image reading device.

In FIG. 1, an image forming apparatus 1 is, for example, a copier, a printer, a facsimile machine, or a multifunction peripheral. The multifunction peripheral has a plurality of functions such as a copy function, a print function, and a facsimile function.

The image forming apparatus 1 includes an image reading device 2 and a main body device 3.

The image reading device 2 is provided in an upper portion of the main body device 3. It is noted that the image reading device 2 may be, for example, a scanner independent of the image forming apparatus 1.

In addition, the image reading device 2 includes a control circuit (not shown) including a CPU, a ROM, and a RAM.

The CPU executes a program that has been stored in advance in the ROM, by using the RAM as a work area. This allows the CPU to comprehensively control the image forming apparatus 1 and execute various processes such as an image reading process and an image forming process.

It is noted that the control circuit may be provided in the main body device 3. In addition, the control circuit may be an electronic circuit such as an ASIC (Application Specific Integrated Circuit) or a DSP (Digital Signal Processor).

Figure 2:
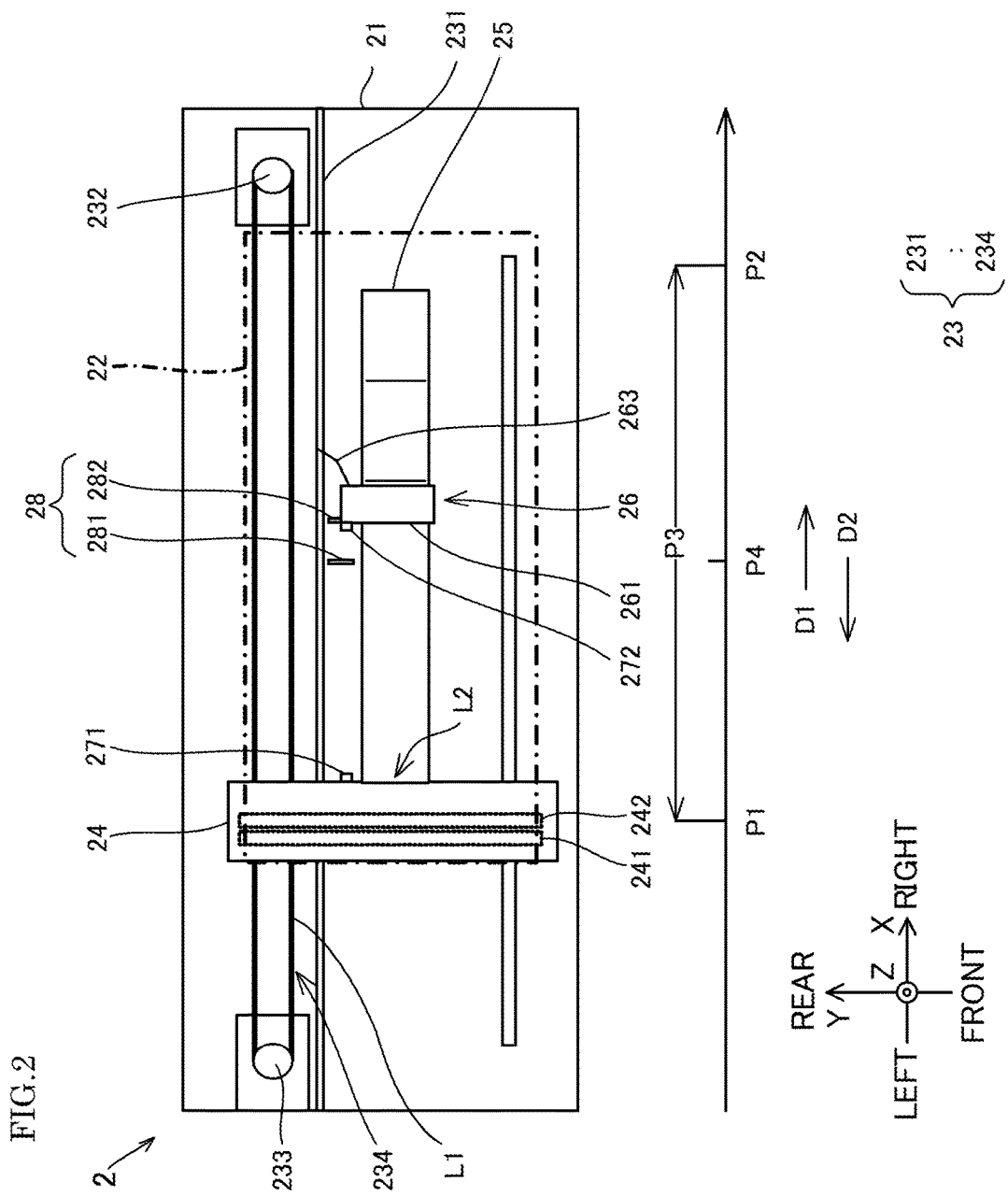
FIG. 2 is a top diagram schematically showing a main part of the image reading device shown in FIG. 1.

As shown in FIG. 1 and FIG. 2, the image reading device 2 includes a housing 21, a contact plate 22, a feeder 23, a sensor unit 24, and a flexible transmission path 25.

The contact plate 22 is provided on an upper surface of the housing 21. In addition, the feeder 23, the sensor unit 24, the flexible transmission path 25, a charge remover 26 and the like are stored in the housing 21.

The contact plate 22 is a flat plate formed from a light transmissive material. A document sheet that is a target of the image reading process is placed on the contact plate 22.

The contact plate 22 includes a placing surface S1 and a lower surface S2 that are both rectangular in a plan view from above. The placing surface S1 and the lower surface S2 face each other in an up-down direction indicated by the arrow Z.

In the image reading device 2, a reading start position P1 and a reading end position P2 are set in advance, wherein the reading start position P1 and the reading end position P2 are in a left-right direction indicated by the arrow X (hereinafter, such positions are referred to as left-right direction positions). The reading start position P1 is closer to a left side of the placing surface S1. The reading end position P2 is rightward away from the reading start position P1 by a predetermined distance. The predetermined distance corresponds to a maximum length of the document sheet in the left-right direction that can be read by the image reading device 2 (hereinafter, such a length is referred to as a left-right direction length).

It is noted that the control circuit may recognize, before the image reading process, the left-right direction length of an image of a document sheet placed on the placing surface S1. In this case, the control circuit may change the reading end position P2 based on the recognized left-right direction length.

In addition, in the following, an interval between the reading start position P1 and the reading end position P2 is referred to as a reading range P3. When the document sheet is placed on the reading range P3, the sensor unit 24 can read an image on the document sheet.

In addition, a direction from the reading start position P1 toward the reading end position P2 is referred to as a forward direction D1, and an opposite direction to the forward direction D1 is referred to as a backward direction D2.

The feeder 23 includes a guide rail 231, a drive pulley 232, a tension pulley 233, and an endless belt 234.

The guide rail 231 is a rod-like member extending along the left-right direction parallel to the placing surface S1. Opposite ends of the guide rail 231 are fixed to the housing 21.

The drive pulley 232, the tension pulley 233, and the endless belt 234 are provided at positions corresponding to a lower portion of the sensor unit 24. The endless belt 234 is stretched over the drive pulley 232 and the tension pulley 233.

When the drive pulley 232 is rotated forwardly or backwardly by a rotational driving force received from, for example, a pulse motor (not shown), the endless belt 234 moves in the forward direction D1 or the backward direction D2. This allows the feeder 23 to generate a first driving force or a second driving force, the first driving force being a driving force in the forward direction D1, the second driving force being a driving force in the backward direction D2.

The sensor unit 24 is provided below the contact plate 22, and is reciprocally moved by a straight portion L1 of the endless belt 234. In addition, the sensor unit 24 has a through hole extending in the left-right direction, and is supported by the guide rail 231 that is passed through the through hole.

The sensor unit 24 is an unmagnification optical system CIS (Contact Image Sensor) or a reduction optical system sensor unit, and generates image data by optically scanning an image on the document sheet.

Specifically, the sensor unit 24 includes a light source 241 and an image sensor 242. The image sensor 242 includes a CMOS (Complementary Metal Oxide Semiconductor) or a CCD (Charge Coupled Device) line sensor.

The light source 241 is a combination of one or more light-emitting elements and one or more light guides, or a fluorescent lamp.

The sensor unit 24 reciprocally moves in the reading range P3 while the rotational driving force is applied to the feeder 23.

Specifically, the feeder 23 generates the first driving force, and moves the light source 241 and the image sensor 242 included in the sensor unit 24 in the forward direction D1 from the reading start position P1 to the reading end position P2. During this, in the sensor unit 24, the light source 241 generates linear light extending in the front-rear direction indicated by the arrow Y, and emits the linear light to the document sheet on the reading range P3. In addition, in the sensor unit 24, the image sensor 242 receives light reflected from the document sheet, generates image data based on the received light, and outputs the image data to the flexible transmission path 25.

After the generation of the image data, the feeder 23 generates the second driving force, and moves the light source 241 and the image sensor 242 included in the sensor unit 24 in the backward direction D2, thereby returning them from the reading end position P2 to the reading start position P1.

The flexible transmission path 25 is formed from flexible lines. Specifically, the flexible transmission path 25 of the present embodiment is a FFC (Flexible Flat Cable) in which a plurality of flat linear conductors are arranged in parallel at equal intervals and sandwiched between two electric insulating films. The flexible transmission path 25 is not limited to the FFC, but may be a FPC (Flexible Printed Circuit). The FPC is a flexible circuit board in which an electric circuit is formed on a base material that is formed by bonding an insulating film and a conductive film to each other.

One end of the flexible transmission path 25 is electrically connected to a predetermined connection portion L2 of the sensor unit 24. The connection portion L2 includes a connector for transmitting image data between the flexible transmission path 25 and the image sensor 242 that is included in the sensor unit 24. The flexible transmission path 25 extends from the connection portion L2 in the forward direction D1, is curved (namely folded) in the middle, and reaches a specific location L3 on a bottom of the housing 21. That is, the flexible transmission path 25 extends from the connection portion L2 to the specific location L3 and curved between the connection portion L2 and the specific location L3, The left-right direction position of the specific location L3 is a predetermined position within the reading range P3. Specifically, the flexible transmission path 25 is stored in the housing 21 of the image reading device 2, in a state of being curved so as to be able to follow the reciprocal movement of the sensor unit 24.

The flexible transmission path 25 may be fixed to the bottom in the vicinity of the specific location L3 with fixing seal or the like. In this case, the other end of the flexible transmission path 25 may be connected to the control circuit that is provided on the backward direction D2 side of the specific location L3.

In addition, in a case where the control circuit is provided in the main body device 3, the flexible transmission path 25 may be passed through a slit formed at the specific location L3, and connected to the control circuit.

An output image data from the sensor unit 24 is transmitted through the flexible transmission path 25 and received by the control circuit.

It is noted that the plurality of flat linear conductors may include a flat linear conductor for power supply to the sensor unit 24 and a flat linear conductor for a ground line, as well as those for data transmission.

Returning to FIG. 1, the main body device 3 includes an image former 31.

The image former 31 includes a photoconductor drum 311, a charger 312, a developing device 313, a transfer device 314, a fixing roller 315, and a pressure roller 316, and forms, by an electrophotographic system, an image on a sheet based on the image data sent to the control circuit.

It is noted that the image former 31 may form a monochrome image, or may form a color image by a tandem system, for example. In addition, the image former 31 may form an image on a sheet by an inkjet system.

A user of the image forming apparatus 1 opens and closes a document sheet table cover (not shown) to place the document sheet on the reading range P3, the document sheet table cover being openable and closable with respect to the contact plate 22. In the closing and opening, the contact plate 22 comes in contact with and is separated from the document sheet table cover. Due to this, the contact plate 22 may be electrically charged. In particular, in a case where the contact plate 22 is made of glass, the contact plate 22 is apt to be charged positive.

In addition, the flexible transmission path 25 is disposed below the contact plate 22. As a result, when the contact plate 22 is electrically charged, the electric insulating films of the flexible transmission path 25 may be induction charged. In a case where reduction in height of the image reading device 2 is sought, the distance between the contact plate 22 and the flexible transmission path 25 will be shorter, which will cause the induction charge to occur more easily. It is noted here that when the electric insulating films are made of a resin material such as polyethylene, they are apt to be charged negative.

In addition, when the sensor unit 24 is moved in the forward direction D1, the flexible transmission path 25 may be deformed and come in contact with the lower surface S2. The contact plate 22 and the electric insulating films are apt to be charged to opposite polarities, and thus may stick to each other. This may inhibit a stable operation of the sensor unit 24.

In view of the above-mentioned problem, the image reading device 2 includes the charge remover 26, a first sticking portion 271, a second sticking portion 272, and a stopper 28.

Figure 3:
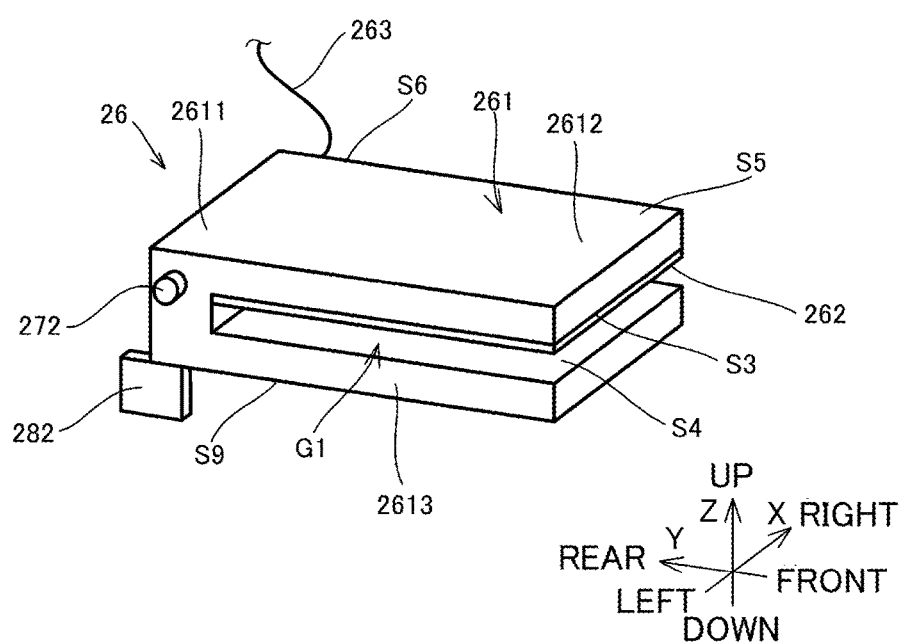
FIG. 3 is a schematic diagram showing a detailed configuration of a charge remover shown in FIG. 2.

As shown in FIG. 2 and FIG. 3, the charge remover 26 includes a main body 261, a conductor 262, and a ground conductor 263.

The main body 261 is formed from resin or the like by integral molding, and as shown in FIG. 3, includes a connector 2611, an upper holder 2612, and a lower holder 2613.

The upper holder 2612 and the lower holder 2613 respectively project forward from an upper portion and a lower portion of the connector 2611. A lower surface S3 of the upper holder 2612 and an upper surface S4 of the lower holder 2613 are formed to be flat, and face each other with a predetermined interval therebetween in the up-down direction.

It is noted that an upper surface S5 of the upper holder 2612 may be formed to be flat, by taking into consideration of the fact that it may come in contact with the contact plate 22.

The predetermined interval is larger than the thickness of the flexible transmission path 25 by a predetermined margin. It is noted that the thickness is a measurement in the up-down direction.

In addition, the width of each of the lower surface S3 and the upper surface S4 is larger than the width of the flexible transmission path 25 by a predetermined margin. It is noted that the width is a measurement in the front-rear direction.

The conductor 262 is a thin film formed from a conductive material, and is formed on the lower surface S3. In addition, the conductor 262 is grounded via the ground conductor 263. The conductor 262 covers a right side surface S6 of the upper holder 2612 from the lower surface S3 so as to be electrically connected to the ground conductor 263.

The flexible transmission path 25 is inserted through a space G1 surrounded by the lower surface S3 and the upper surface S4. The conductor 262 abuts on the upper surface of the flexible transmission path 25 by the weight of the charge remover 26 itself.

It is noted that in the main body 261, the upper holder 2612 and the lower holder 2613 may be connected to each other at opposite sides in the front-rear direction. In this case, the main body 261 has a flat annular shape.

In addition, the main body 261 of a flat annular shape may be formed from a magnetic material such as ferrite, other than resin. In this case, the main body 261 is a magnetic core through which the flexible transmission path 25 is inserted. The conductor 262 is provided on an inner circumferential surface of the magnetic core. It is noted that the magnetic core removes noise that occurs from the flexible transmission path 25.

The ground conductor 263 is, for example, a coated wire. Coating of the ground conductor 263 is stripped at opposite ends thereof. One end of the ground conductor 263 is fixed to the conductor 262 on the right side surface S6, by, for example, soldering. Since the ground conductor 263 is not fixed to the upper surface S5, and the upper surface S5 is flat, the lower surface S2 of the contact plate 22 is prevented from being damaged.

As shown in FIG. 2, the other end of the ground conductor 263 is hooked on the guide rail 231 such that the conductor 262 is electrically connected to the guide rail 231. Here, the guide rail 231, from one end to the other end, is made of a conductive material. In addition, the guide rail 231 is grounded to a reference potential point such as a housing ground. As a result, the conductor 262 is grounded. Since the guide rail 231 is provided along the flexible transmission path 25, the ground conductor 263 can be made short.

It is noted that the ground conductor 263 may be grounded without using the guide rail 231. Firstly, the ground conductor 263 may be directly grounded to, for example, the housing ground. Secondly, in a typical case where the ground line or the like is exposed at opposite ends of the flexible transmission path 25, the ground conductor 263 may be connected to an exposed portion of the ground line.

The first sticking portion 271 is, for example, a magnet, and is fixedly provided on a right side surface S7 of the sensor unit 24. In other words, the first sticking portion 271 is provided on a side of the image sensor 242. The second sticking portion 272 is, for example, a metal, and is fixedly provided on a left side surface S8 of the sensor unit 24. In other words, the second sticking portion 272 is provided on the charge remover 26 side.

More specifically, the first sticking portion 271 and the second sticking portion 272 are disposed so as to face each other in the forward direction D1 when the charge remover 26 stops at a stop position P4 that is described below. With this configuration, when the sensor unit 24 moved in the forward direction D1 passes the stop position P4, the first sticking portion 271 sticks to the second sticking portion 272.

It is noted that the first sticking portion 271 may be fixed to the main body 261, and the second sticking portion 272 may be fixed to the sensor unit 24. In addition, the second sticking portion 272 may be a magnet.

The stopper 28 includes a first projection 281 and a second projection 282.

As shown in FIG. 1, the stop position P4 is preliminarily set in the image reading device 2. The stop position P4 is a position within the reading range P3, and away from the reading start position P1 in the forward direction D1. The first projection 281 is positioned such that it comes in contact with the second projection 282 when the charge remover 26 moving in the backward direction D2 stops at the stop position P4. When the first projection 281 and the second projection 282 contact each other, the charge remover 26 is inhibited from moving from the stop position P4 in the backward direction D2.

The first projection 281 projects upward at the stop position P4 from the bottom of the housing 21. It is noted that the front-rear direction position of the first projection 281 matches the front-rear direction position of the second projection 282 that is described below.

As shown in FIG. 3, the second projection 282 projects downward from a bottom surface S9 of the charge remover 26.

Figure 4A:
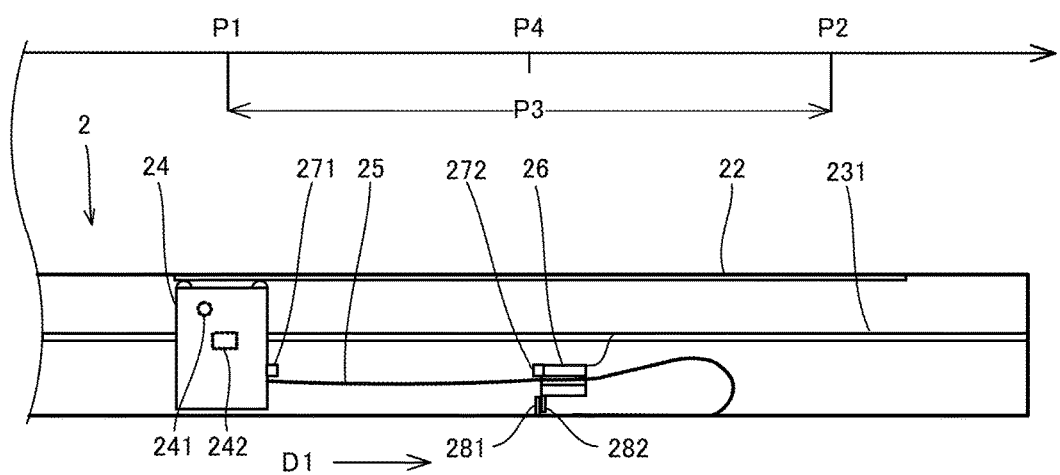
FIG. 4A is a schematic diagram showing an operation of the main part of the image reading device when a scanner unit shown in FIG. 2 is moved from a reading start position in a forward direction.
Figure 4B:
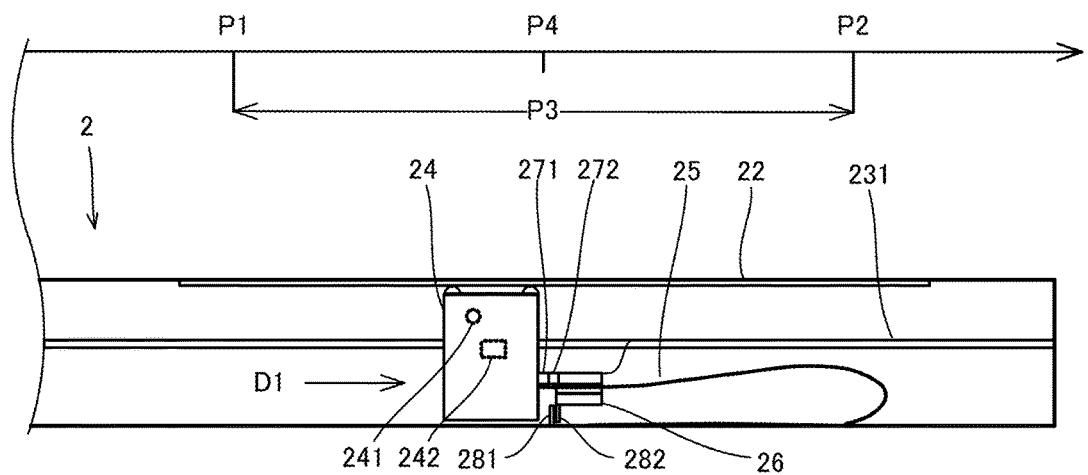
FIG. 4B is a schematic diagram showing an operation of the main part of the image reading device when the scanner unit shown in FIG. 2 is moved in the forward direction within a range between the reading start position and a reading end position.
Figure 4C:
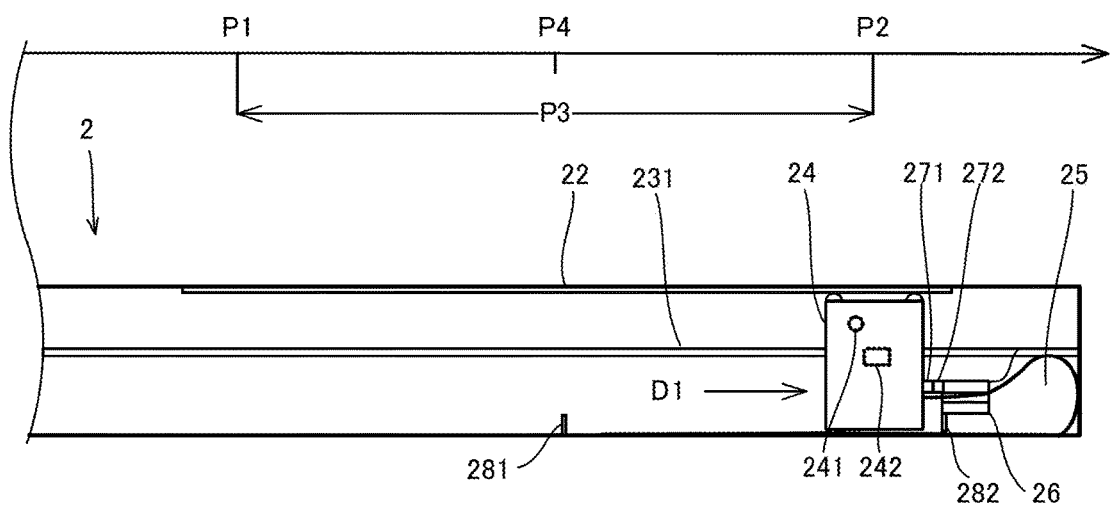
FIG. 4C is a schematic diagram showing an operation of the main part of the image reading device when the scanner unit shown in FIG. 2 has reached the reading end position.

More specifically, as shown in FIG. 4A to FIG. 4C, the sensor unit 24 slides on the guide rail 231 when it is moved in the forward direction D1 within the reading range P3. In other words, the guide rail 231 guides the light source 241 and the image sensor 242 when they are moved in the forward direction D1 within the reading range P3. The first sticking portion 271 sticks to the second sticking portion 272 of the charge remover 26 that has stopped at the stop position P4. Thereafter, the first sticking portion 271 and the second sticking portion 272 keep on sticking to each other until the sensor unit 24 being moved in the forward direction D1 reaches the reading end position P2. That is, when the sensor unit 24 moves in the forward direction D1, the charge remover 26 moves in the forward direction D1 together with the sensor unit 24 from the stop position P4. As a result, when the sensor unit 24 moves up to the reading end position P2, the charge remover 26 moves up to a position on the forward direction D1 side of the reading end position P2.

Figure 5A:
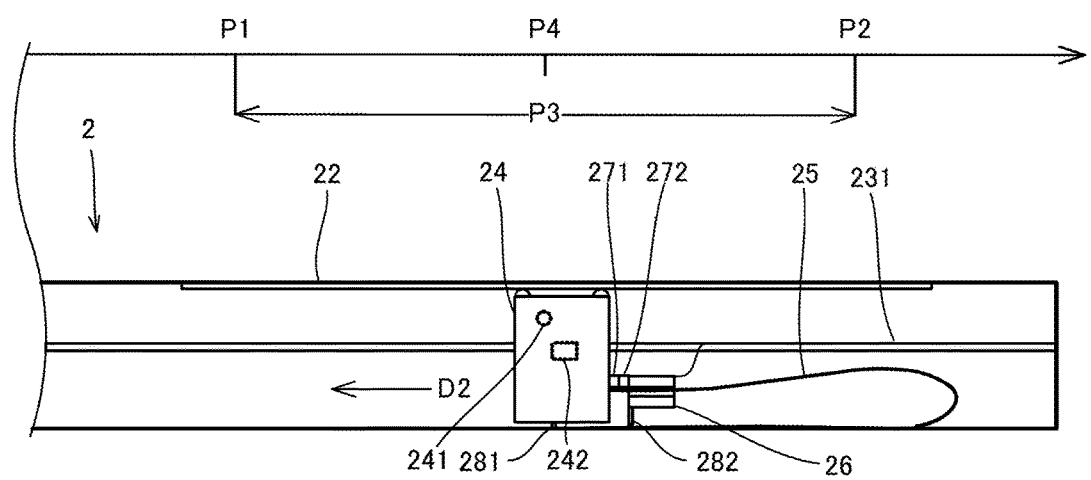
FIG. 5A is a schematic diagram showing an operation of the main part of the image reading device when the scanner unit shown in FIG. 2 has reached a stop position during a process of being moved in a backward direction.

In addition, as shown in FIG. 5A, the first sticking portion 271 and the second sticking portion 272 stick to each other until the charge remover 26 reaches the stop position P4 during a process in which the sensor unit 24 is moved in the backward direction D2 within the reading range P3. When the charge remover 26 reaches the stop position P4, the second projection 282 of the stopper 28 abuts on the first projection 281. This prohibits the charge remover 26 from moving in the backward direction D2, and the charge remover 26 stops at the stop position P4. In addition, the first sticking portion 271 (namely, the light source 241 and the image sensor 242 included in the sensor unit 24) is separated from the second sticking portion 272 (namely, the charge remover 26). That is, with the reciprocal movement of the light source 241 and the image sensor 242 included in the sensor unit 24, the charge remover 26 moves between the stop position P4 and a position that is on the reading end position P2 side of the stop position P4.

Here, during a movement of the sensor unit 24, the flexible transmission path 25 is deformed relatively largely on the reading end position P2 side within the reading range P3, and is apt to come in contact with the contact plate 22. In view of this, the stop position P4 may be set to a central position within the reading range P3, or to a position that is closer to the reading end position P2 than to the reading start position P1 within the reading range P3. In this case, by the weight of the charge remover 26 itself, the flexible transmission path 25 is prohibited from contacting the contact plate 22.

Figure 5B:
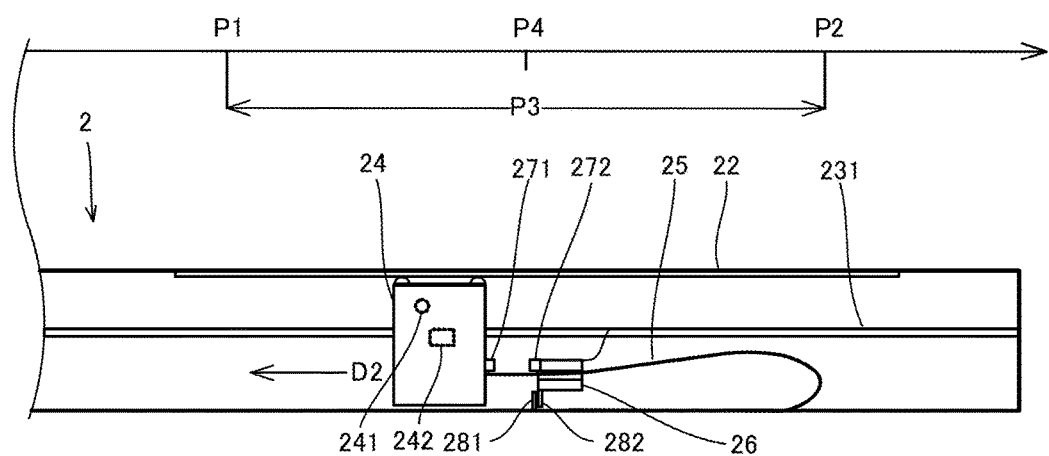
FIG. 5B is a schematic diagram showing an operation of the main part of the image reading device immediately after the scanner unit shown in FIG. 2 has moved from the stop position in the backward direction.

As shown in FIG. 5B, since the sensor unit 24 is moved toward the reading start position P1 even after passing the stop position P4, an upper surface of the flexible transmission path 25 slides on the conductor 262 from the connection portion L2. At this time, if the electric insulating films of the flexible transmission path 25 have been electrically charged, minus charges move to the reference potential point via the conductor 262 and the ground conductor 263, and charges are removed from the flexible transmission path 25. As a result, it is possible to prevent the flexible transmission path 25 from sticking to the contact plate 22, and allow the sensor unit 24 to operate stably.

It is noted that the charge remover 26 may be fixedly provided at the stop position P4 that is set to a position on the forward direction D1 side of the reading end position P2. When the stop position P4 is set in this way, the charge remover 26 can remove charges from the flexible transmission path 25 in the same manner as the above-described manner, without the first sticking portion 271, the second sticking portion 272, and the stopper 28.

In addition, in a conventional image reading device, as a measure to prevent the problems, a conductive film may be contacted with the contact plate while the conductive film is grounded so as to remove charges from the contact plate.

However, even when such a measure is taken to remove charges from the contact plate, it is difficult to remove charges from a reading range of the contact plate, and thus it is difficult to prevent a flexible transmission path from sticking to the contact plate.

Specifically, since a document sheet is placed on the contact plate, the conductive film needs to be provided outside the reading range. However, since the glass has electric insulation property, charges would not move from the reading range to the conductive film. When charges are not removed sufficiently, the flexible transmission path is induction charged. As a result, the above-mentioned measure is not effective in preventing the sticking.

However, in the image reading device 2, the upper surface of the flexible transmission path 25 slides while directly in contact with the conductor 262, and thus charges are removed sufficiently from the flexible transmission path 25. Accordingly, even when the reading range P3 has been charged, the image reading device 2 can prevent the sticking better than the above-mentioned measure.

In addition, according to the above-mentioned measure, since charges are not removed sufficiently from the reading range of the contact plate, it is difficult to dispose the flexible transmission path directly below the reading range. For this reason, the above-mentioned measure requires a further countermeasure to prevent the sticking. For example, the flexible transmission path may be disposed directly below the conductive film, the flexible transmission path may be kept sufficiently away from the housing 21, or the flexible transmission path may be made thicker so that the flexible transmission path is hardly deformed.

However, according to the image reading device 2, even when the flexible transmission path 25 is disposed directly below the reading range P3, the charge remover 26 can prevent the sticking. Accordingly, there is no need to dispose the flexible transmission path 25 directly below a position outside the reading range of the contact plate 22. As a result, it is possible to shorten the housing 21 in the front-rear direction.

In addition, according to the image reading device 2, the charge remover 26 removes charges from the flexible transmission path 25 itself, and thus there is no need to keep the flexible transmission path 25 sufficiently away from the contact plate 22. In other words, the flexible transmission path 25 and the contact plate 22 can be disposed in the housing 21 in a state of being closer to each other than in the case of the above-mentioned measure. As a result, it is possible to shorten the housing 21 in the up-down direction.

Furthermore, according to the image reading device 2, the charge remover 26 removes charges from the flexible transmission path 25 itself, and thus there is no need to make the flexible transmission path 25 thicker.

The following describes another embodiment of the present disclosure. It is noted that in the other embodiment described in the following, components that are the same as those of the above-described embodiment are assigned the same reference signs, and description thereof is omitted.

Figure 6:
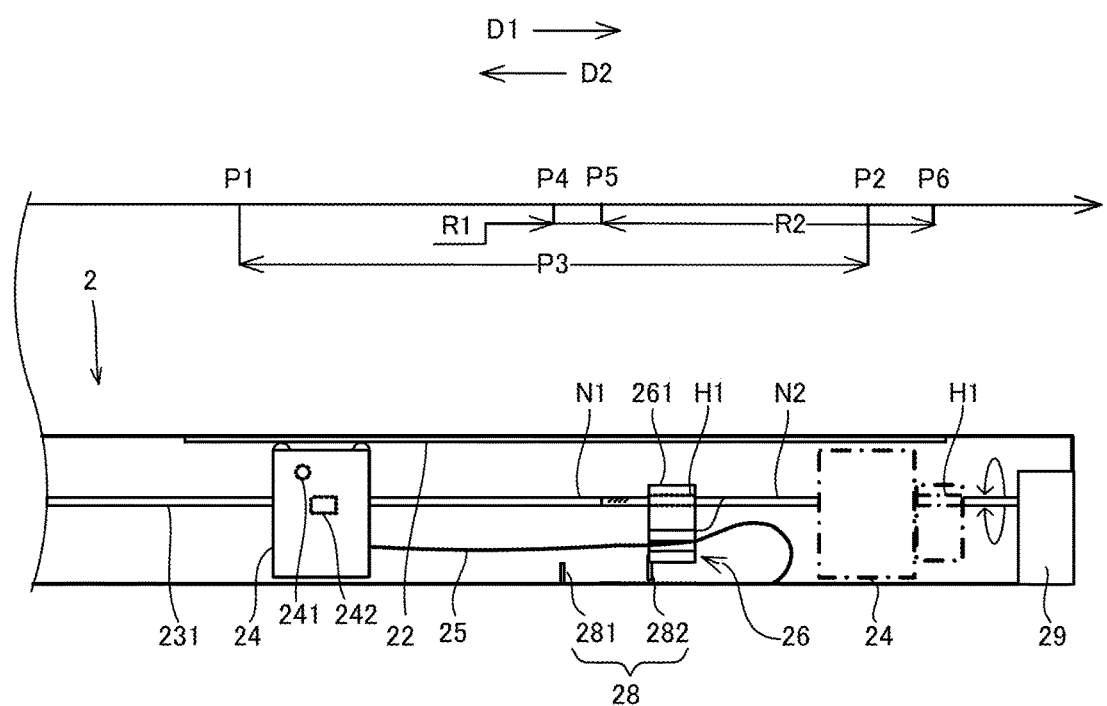
FIG. 6 is a schematic diagram showing an image reading device according to another embodiment of the present disclosure.

As shown in FIG. 6, the image reading device 2 does not include the first sticking portion 271 and the second sticking portion 272.

In addition, in the charge remover 26, a screw hole H1 is formed in the main body 261 such that the guide rail 231 is inserted through the screw hole H1. As a result, the shape of the main body 261 is different from that in the above-described embodiment.

The guide rail 231 includes a non-screw portion N1 and a screw portion N2, and is supported so as to be rotatable around a center axis that is parallel to the forward direction D1.

The guide rail 231 is inserted through the screw hole H1. In addition, the charge remover 26 is disposed on the forward direction D1 side of the stop position P4.

The non-screw portion N1 is a portion of the guide rail 231 on whose circumference, no screw is formed. Specifically, the non-screw portion N1 is provided in a first range R1 which is immediately on the forward direction D1 side of the stop position P4. The length of the first range R1 in the forward direction D1 corresponds to the length of the screw hole H1 in the forward direction D1.

The screw portion N2 is a portion of the guide rail 231 on whose circumference, a screw to be screwed to the screw hole H1 is formed. Specifically, the screw portion N2 is provided in a second range R2 which ranges from a first end position P5 to a second end position P6 that is preliminarily set in the forward direction D1, the first end position P5 being an end position of the first range R1 in the forward direction D1.

The second end position P6 is set such that when the sensor unit 24 reaches the reading end position P2 (as indicated by the one-dot chain line in FIG. 6), the second end position P6 is on the forward direction D1 side of an end of the screw hole H1 that is on the backward direction D2 side.

The image reading device 2 includes a driving force transmitter 29 for rotating the guide rail 231.

While the light source 241 and the image sensor 242 included in the sensor unit 24 are moved within the reading range P3 in the forward direction D1, the driving force transmitter 29 transmits a first rotational driving force to the guide rail 231 so as to move the charge remover 26 in the forward direction D1.

While the sensor unit 24 is moved within the reading range P3 in the backward direction D2, the driving force transmitter 29 transmits a second rotational driving force to the guide rail 231 so as to move the charge remover 26 in the backward direction D2.

More specifically, at the start of the image reading process, the charge remover 26 is positioned at the non-screw portion N1. During a process of being moved within the reading range P3 in the forward direction D1, the sensor unit 24 presses the charge remover 26 from the stop position P4 in the forward direction D1. When the charge remover 26 is pressed by the sensor unit 24, the screw hole H1 is engaged with the screw portion N2. Thereafter, the charge remover 26 is moved by the first rotational driving force in the forward direction D1.

In addition, during a process in which the sensor unit 24 is moved within the reading range P3 in the backward direction D2 in a state where the screw hole H1 is engaged with the screw portion N2, the charge remover 26 is moved by the second rotational driving force in the backward direction D2. Immediately after the charge remover 26 reaches the stop position P4, the screw hole H1 moves to the non-screw portion N1. In addition, when the second projection 282 abuts on the first projection 281, the stopper 28 stops the charge remover 26 at the stop position P4, thereby prohibiting the charge remover 26 from moving in the backward direction D2.

The sensor unit 24 is moved toward the reading start position P1 even after passing the stop position P4, and thus the upper surface of the flexible transmission path 25 slides on the conductor 262.

It is noted that the guide rail 231 may not include the non-screw portion N1. In this case, a torque limiter is provided in the screw hole H1, and the torque limiter is started to operate when the charge remover 26 reaches the stop position P4. With this configuration, the guide rail 231 idles in the screw hole H1, making it possible to prohibit the charge remover 26 from being moved from the stop position P4 in the backward direction D2.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
a contact plate on which a document sheet is placed;
a light source configured to emit light to the document sheet;
an image sensor provided below the contact plate and configured to receive light reflected from the document sheet;
a feeder configured to convey the light source and the image sensor in a forward direction and a backward direction, the forward direction being directed from a reading start position toward a reading end position, the backward direction being an opposite direction to the forward direction;
a flexible transmission path extending from a connection portion that is electrically connected to the image sensor, to a specific location within a reading range between the reading start position and the reading end position, and curved between the connection portion and the specific location, the flexible transmission path being configured to transmit image data therethrough; and a charge remover including a conductor which abuts on an upper surface of the flexible transmission path and is grounded, and configured to, with a reciprocal movement of the light source and the image sensor, move between a stop position that is away from the reading start position in the forward direction, and a position that is on the reading end position side of the stop position.

2. The image reading device according to claim 1, wherein the stop position is within the reading range, and the image reading device further comprises:

a first sticking portion and a second sticking portion that are respectively provided on the image sensor and the charge remover, and stick to each other at a position on the forward direction side of the stop position; and a stopper configured to, during a process in which the light source and the image sensor are moved in the backward direction, cause the charge remover to stop at the stop position, thereby separating the first sticking portion and the second sticking portion from each other.

3. The image reading device according to claim 2, wherein the stop position is any one of a center of the reading range, and a position closer to the reading end position than to the reading start position.

4. The image reading device according to claim 1, further comprising:

a guide rail extending parallel to the contact plate, configured to guide the light source and the image sensor that are moved within the reading range, having conductivity, grounded, and electrically connected to the conductor.

5. The image reading device according to claim 1, wherein the stop position is within the reading range, a screw hole is formed in the charge remover, and the image reading device further comprises:

a guide rail extending parallel to the contact plate, configured to guide the light source and the image sensor that are moved within the reading range, and including a non-screw portion in a first range and a screw portion in a second range, wherein no screw is formed on the non-screw portion, a screw is formed on the screw portion, the first range is immediately on the forward direction side of the stop position, the second range ranges from a first end position to a second end position that is preliminarily set in the forward direction, the first end position being an end position of the first range in the forward direction, and the guide rail is inserted through the screw hole in a range on the forward direction side of the stop position;

a driving force transmitter configured to transmit a first rotational driving force to the guide rail so as to move the charge remover in the forward direction while the light source and the image sensor are moved in the forward direction, and transmit a second rotational driving force to the guide rail so as to move the charge remover in the backward direction while the light source and the image sensor are moved in the backward direction; and a stopper configured to, during a process in which the light source and the image sensor are moved in the backward direction, cause the charge remover to stop at the stop position, wherein a length of the first range in the forward direction corresponds to a length of the screw hole in the forward direction, and the second end position is set such that when the light source and the image sensor reach the reading end position, the second end position is on the forward direction side of an end of the screw hole that is on a backward direction side.

6. The image reading device according to claim 5, wherein the guide rail has conductivity, is grounded, and is electrically connected to the conductor.

7. The image reading device according to claim 1, wherein the charge remover includes a magnetic core through which the flexible transmission path is inserted, and on whose inner circumferential surface, the conductor is provided.

8. An image forming apparatus comprising:

the image reading device according to claim 1; and an image former configured to form an image based on image data generated by the image sensor.

* * * * *